April 9, 1929.  W. H. KLOCKE  1,708,673
EXPANDER
Filed Jan. 31, 1927   3 Sheets-Sheet 1
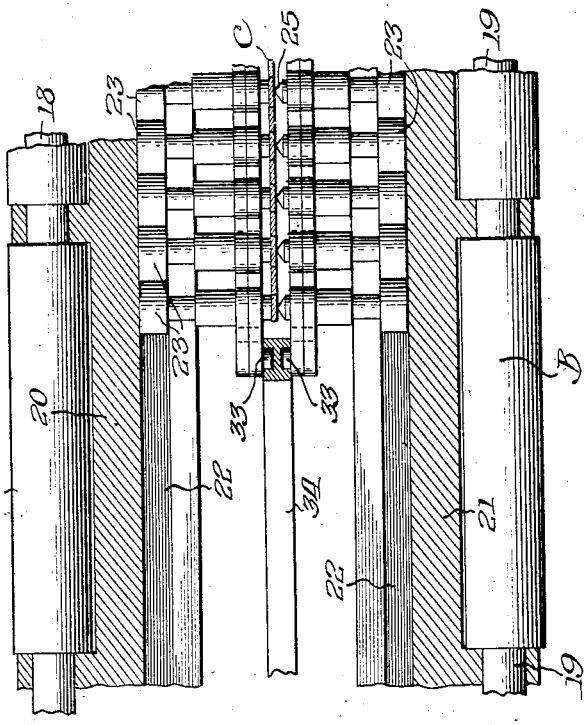
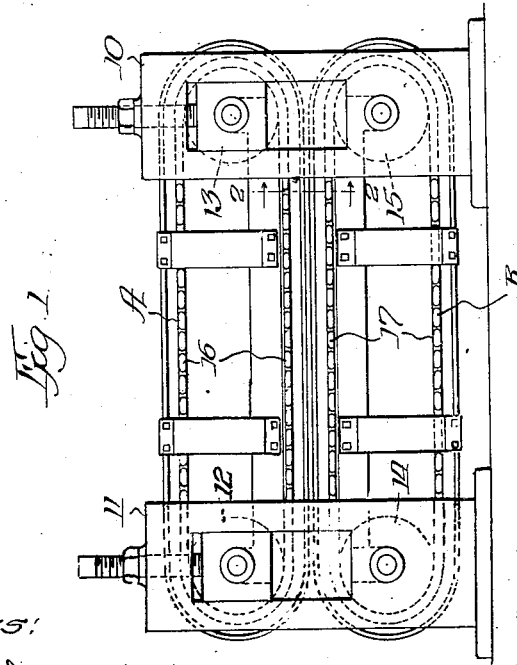

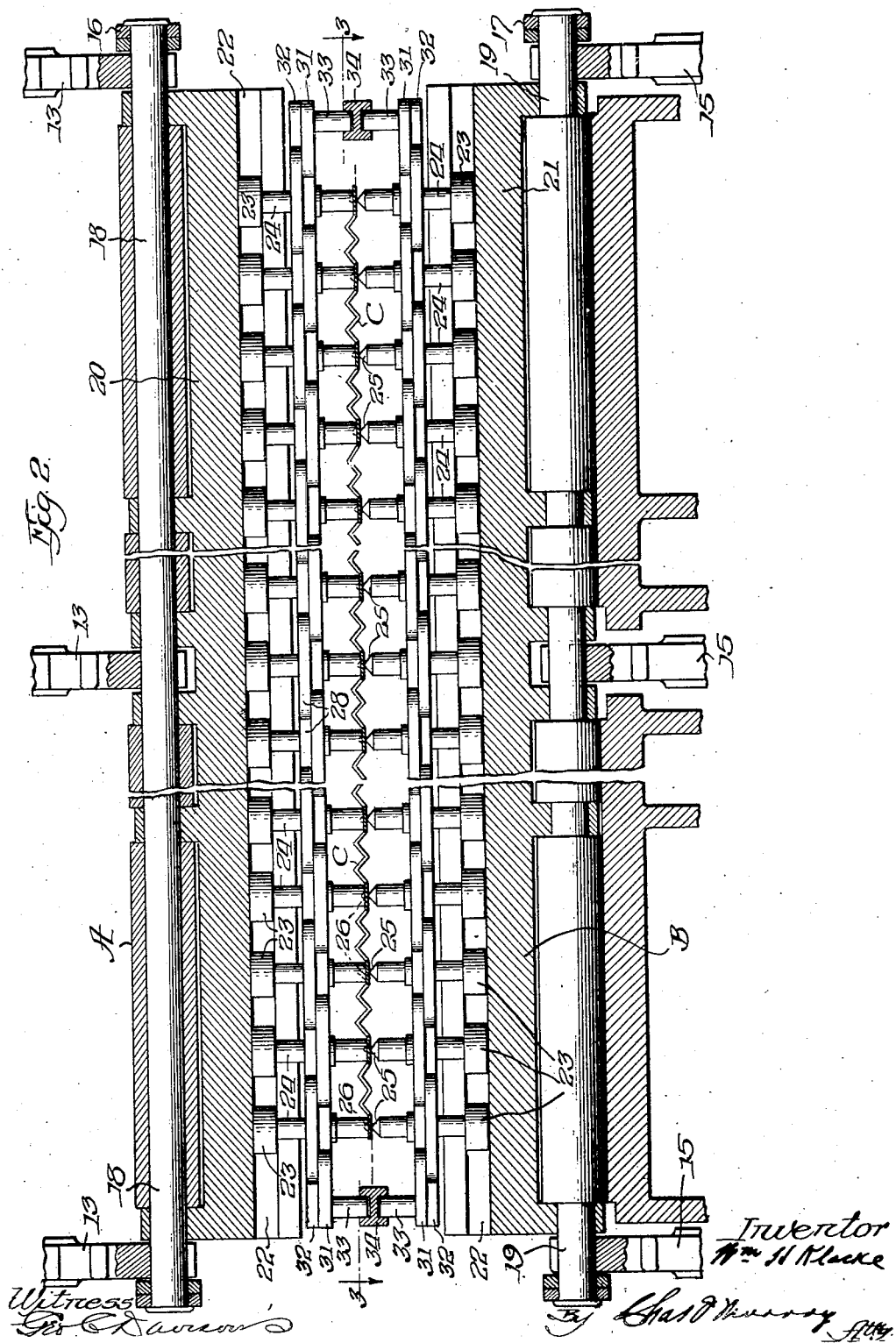

April 9, 1929. W. H. KLOCKE 1,708,673
EXPANDER
Filed Jan. 31, 1927 3 Sheets-Sheet 3
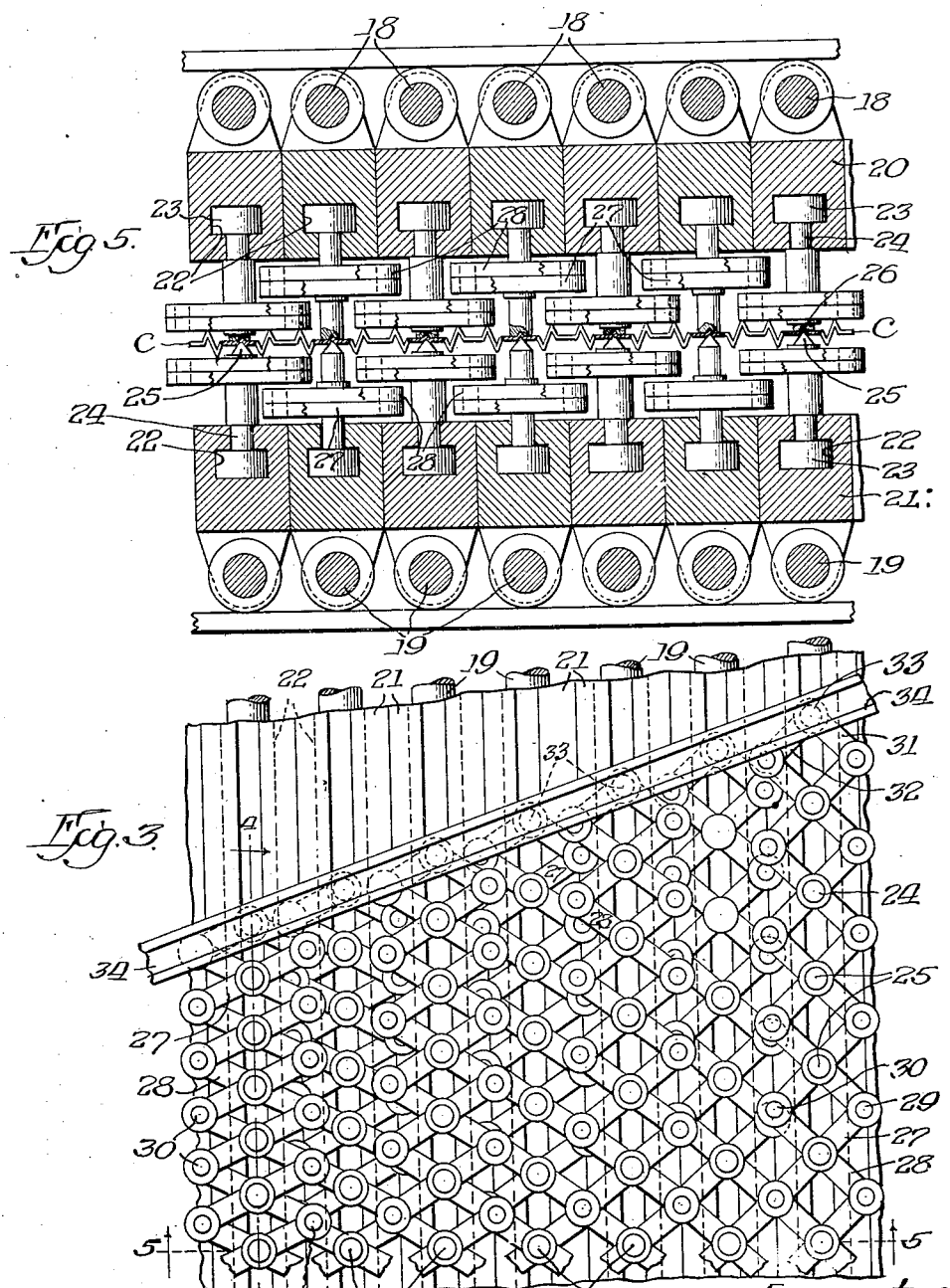

Patented Apr. 9, 1929.

1,708,673

UNITED STATES PATENT OFFICE.

WILLIAM H. KLOCKE, OF WOODHAVEN, NEW YORK, ASSIGNOR TO KALMAN STEEL COMPANY, OF CHICAGO, ILLINOIS, A CORPORATION OF DELAWARE.

EXPANDER.

Application filed January 31, 1927. Serial No. 164,861.

My invention relates to a device for use in producing expanded metal. It contemplates the performance of the expanding operation on a slitted sheet of metal.

While the invention is disclosed in association with a slitted sheet that has been previously ribbed, it will be understood that the device is adaptable for use in connection with sheets of different form. The metal lath produced by the device here illustrated is disclosed in Letters Patent of the United States to Gersman, No. 1,562,157, of November 17, 1925.

The device here disclosed comprises essentially a pair of endless conveyors mounted in adjacent relation so that a portion of the conveyors travel in parallel paths, the conveyors supporting a series of lazy-tongs, the central pivot points on adjacent registering lazy-tongs being provided with means for engaging the sheet, the movement of the lazy-tongs being effected by one or more cam tracks.

The invention will be more readily understood by reference to the accompanying drawings, in which:

Fig. 1 is a side elevation of a machine constructed in accordance with my invention;

Fig. 2 is a transverse sectional view much enlarged, the view being taken on the line 2—2 of Fig 1;

Fig. 3 is a fragmentary plan view, the view being taken on the line 3—3 of Fig. 2, the sheet being omitted, to enhance clearness;

Fig. 4 is an enlarged fragmentary sectional view on the line 4—4 of Fig. 3; and

Fig. 5 is a fragmentary sectional view on the line 5—5 of Fig. 3.

In the drawings, it will be seen that the device comprises housings, 10, 11, carrying suitable shafts on which are mounted upper sprocket wheels, 12, 13, and lower sprocket wheels, 14, 15. As shown in Fig. 2, I may provide three sprocket wheels on each shaft.

Mounted for actuation by the sprocket wheels are conveyors, A, B, comprising sprocket chains, 16, 17, transverse rods or shafts, 18, 19, and carriers, 20, 21. The chains are mounted on the ends of the shafts and the shafts engage the recesses between the teeth of the sprocket wheels. The conveyors travel in paths so arranged that adjacent portions of the paths are in parallelism. This is best shown in Fig. 5.

The carriers, 20, are provided with longitudinal slots, 22, which act as slideways for the heads, 23, of the studs, 24. The free ends of the studs on the respective upper and lower conveyors are provided with cooperating male and female portions, 25, 26, adapted to grip the sheet when the studs come into registering relation during the travel of the conveyors.

The studs constitute the central pivot points for a series of lazy-tongs, best illustrated in Fig. 3. These lazy-tongs comprise the diagonally disposed links, 27, 28, the ends of which are joined by the floating pivots, 29, 30. The short links, 31, 32, at the ends of the lazy-tongs are pivotally united by means of the stud, 33, shaped to cooperate with the cam tracks 34. It will be noted that because of the lazy-tong construction, the central pivot points, constituting the sheet gripping means, are caused to travel laterally in parallel lines, and to separate progressively and cumulatively as the lazy-tongs are spread under the action of the cam tracks.

In operation, a slitted sheet, C, as best shown in Figs. 4 and 2, is fed into the machine at the left hand end as viewed in Fig. 1, and is thereupon gripped by the registering studs, 24. Under the action of the cam tracks, the lazy-tongs begin to spread and the central pivot points carry the sheet with them laterally from the center in opposite directions, thus causing a gradual spreading of the sheet into the final position of Fig. 2. In that position the gripping devices are shown in the position where they have begun to separate due to the circular motion of the conveyors around the sprockets. In Fig. 4, the parts are shown just at the point where the gripping devices have moved into position ready to grip the sheet.

Obviously the form and arrangement of the mechanism may be varied, materially, without departure from the spirit of my invention, and I do not wish to be limited except as indicated in the appended claims.

I claim:

1. In a sheet metal expanding device the combination of a pair of endless conveyors, a series of lazy-tongs carried by said conveyors, cam tracks for controlling the expansion of said lazy-tongs, and sheet metal gripping devices carried by respective lazy-tongs in position to register and grip a sheet and cause its expansion under the action of the lazy-tongs.

2. In a sheet metal expanding device the combination of a pair of conveyors, means for causing said conveyors to move in parallel paths for a portion of their travel, a series of lazy-tongs, the central pivot points of which are mounted on the respective conveyors with capacity for lateral movement, means located at registering pivot points on opposed lazy-tongs for gripping a sheet, and means for effecting an opening movement of the lazy-tongs with the forward travel of the conveyors.

3. In a sheet metal expanding device the combination of a pair of endless conveyors mounted for travel with a portion of their paths in parallelism, a series of lazy-tongs carried by the conveyors, a stationary cam track adapted to control the opening movement of the lazy-tongs, and sheet gripping devices carried at the pivot points on the lazy-tongs.

4. In an expander for sheet metal, the combination of a pair of conveyor chains, carriers on said chains, a series of lazy-tongs supported by the carriers, a cam track adapted to control the opening movement of the lazy-tongs, the travel of the lazy-tongs carried by upper and lower conveyors being in parallel paths for a portion of their travel, and gripping devices carried at the pivot points on the lazy-tongs, the pivot points on opposed lazy-tongs being adapted to register and grip a sheet therebetween.

5. In a device for expanding sheet metal, the combination of a pair of upper and lower conveyor chains mounted in adajcent relation, a series of lazy-tongs carried by the conveyors, registering sheet gripping devices carried by the lazy-tongs of the upper and lower conveyors, and stationary cam tracks adapted to control the opening movement of the lazy-tongs.

6. In an expanding device for sheet metal, the combination of a pair of endless conveyors, means for causing portions of said conveyors to travel in parallel planes, means carried by the respective conveyors for gripping a sheet at a plurality of points between its edges, and link means at the sheet gripping points for effecting progressive lateral separation of the gripping means to effect the expanding action on the sheet.

7. In a sheet metal expanding device, the combination of a pair of endless conveyors, carriers supported thereby, means for causing the carriers on the respective conveyors to travel in parallel planes throughout a portion of the movement of said carriers, gripping devices mounted on respective opposed carriers and arranged to grip the sheet at a plurality of points between its edges, and means for progressively laterally moving said gripping devices at the points of contact with said sheet, coincidentally with the forward movement of the conveyors for laterally spreading a sheet held by said gripping means.

8. In a sheet metal expander, the combination of a pair of adjacent endless conveyors, means for causing the travel of adjacent portions of said conveyors in parallel lines, carriers mounted on said conveyors, gripping devices mounted on said carriers with capacity for lateral sliding movement, means associated with said gripping devices for engaging and holding a sheet of metal during the period of travel of the conveyors in parallel planes, and link means connected to said gripping devices for effecting progressive lateral separation of the gripping devices and consequent spreading of the sheet held thereby.

9. In a sheet metal expander, the combination of a pair of endless conveyors, carriers mounted thereon, gripping devices mounted on the respective carriers, cam tracks, and link means connected to the gripping devices and operated by said cam tracks for progressively effecting lateral separation of the gripping devices and the spreading of the metal gripped thereby.

10. In a sheet metal expanding machine, the combination of two pairs of endless chains, shafts connecting the chains of each pair, conveyors mounted on the shafts, said conveyors having longitudinal guideways, a cam track, link mechanism operatively connected to said track, and gripping devices at the pivot points of said link mechanism cooperating with said guideways, the gripping devices on respective carriers being adapted to cooperate to grip and hold a sheet and to separate the same by action of the link mechanism.

11. In a sheet metal expander, the combination of a pair of adjacent endless conveyors, means for causing travel of said conveyors in parallel paths throughout a portion of their travel, gripping devices slidably mounted on said conveyors, links connecting respective gripping devices, and a cam track for operating said links, the gripping devices on opposed conveyors being adapted to grip a sheet and said link mechanism being adapted to effect lateral sliding movement of the gripping devices to spread the sheet.

12. In a sheet metal expander, the combination of a pair of endless conveyors, mounted for travel in parallel planes, carriers mounted on the conveyors, sheet engaging grippers mounted on the carriers with capacity for lateral sliding movement, links connecting the gripping devices, and a cam track for controlling the movement of the link mechanism to effect progressive lateral separation of the gripping devices simultaneously with the forward travel of the conveyors.

13. In a sheet metal expander, the combination of a pair of endless conveyors, mounted for travel in parallel lines, carriers mounted on the conveyors, sheet engaging grippers, mounted on the carriers with capacity for lateral sliding movement, links connecting the gripping devices, means for restricting the opening movement of the links, and a cam track for controlling the movement of the link mechanism to effect progressive lateral separation of the gripping devices simultaneously with the forward travel of the conveyors.

In testimony whereof I have affixed my signature.

WILLIAM H. KLOCKE.